June 1, 1971  F. E. McCOMB  3,581,350
BELT SPLICE AND SPLICER
Filed Jan. 21, 1969  3 Sheets-Sheet 1
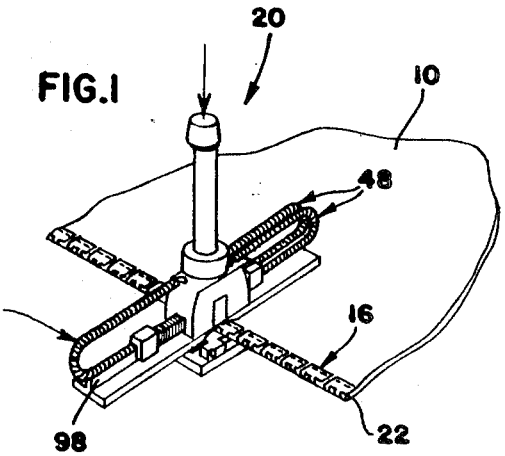
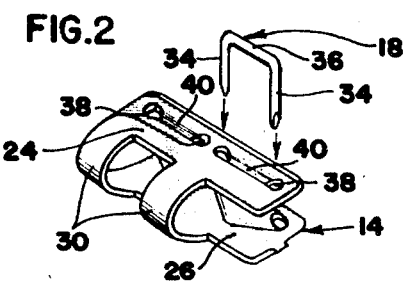
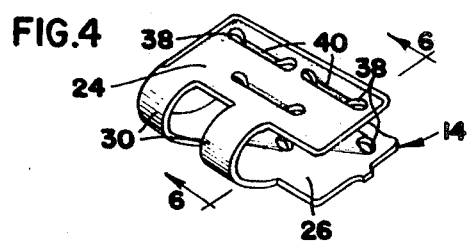
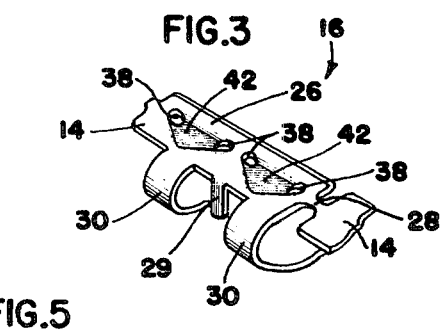
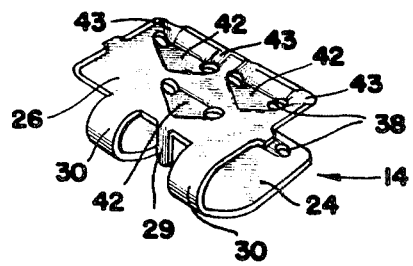
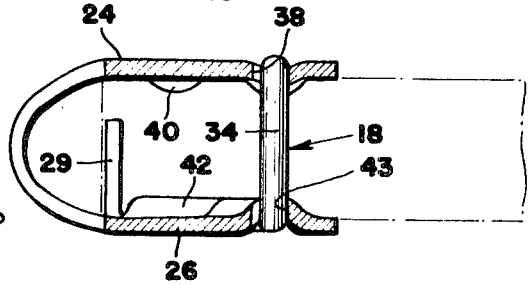
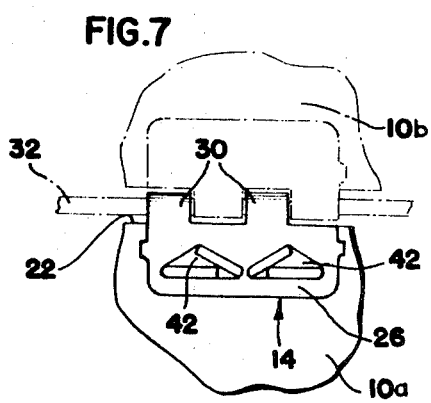
INVENTOR
FRANK E. McCOMB
Anderson, Luedeka, Fitch, Even & Tabin
ATTYS.

June 1, 1971  F. E. McCOMB  3,581,350
BELT SPLICE AND SPLICER
Filed Jan. 21, 1969  3 Sheets-Sheet 2
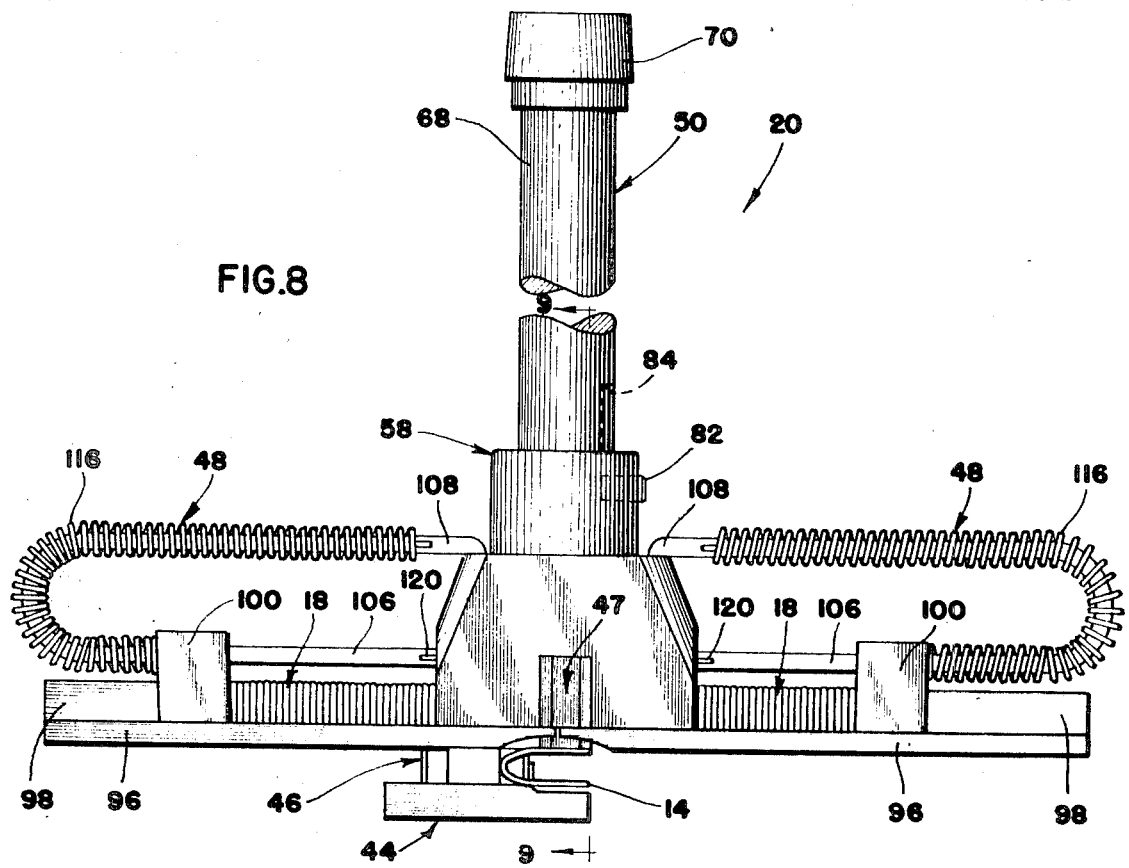
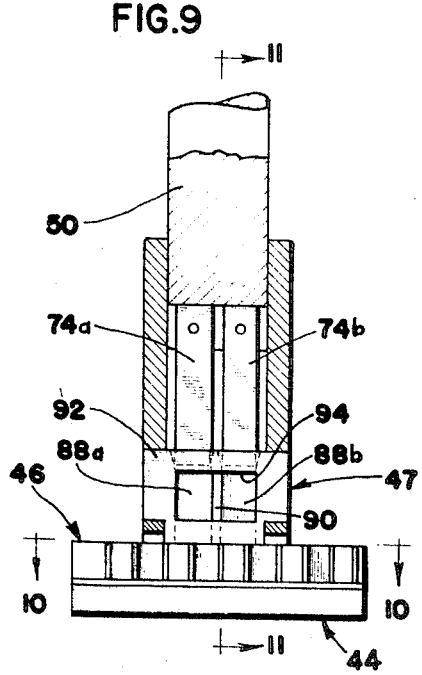
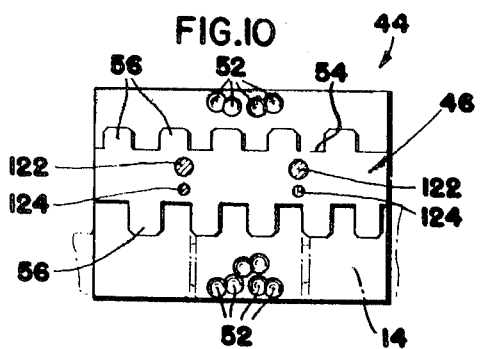
INVENTOR
FRANK E. McCOMB
Anderson, Luedeka, Fitch, Even & Tabin
ATTYS.

June 1, 1971  F. E. McCOMB  3,581,350
BELT SPLICE AND SPLICER
Filed Jan. 21, 1969  3 Sheets-Sheet 3
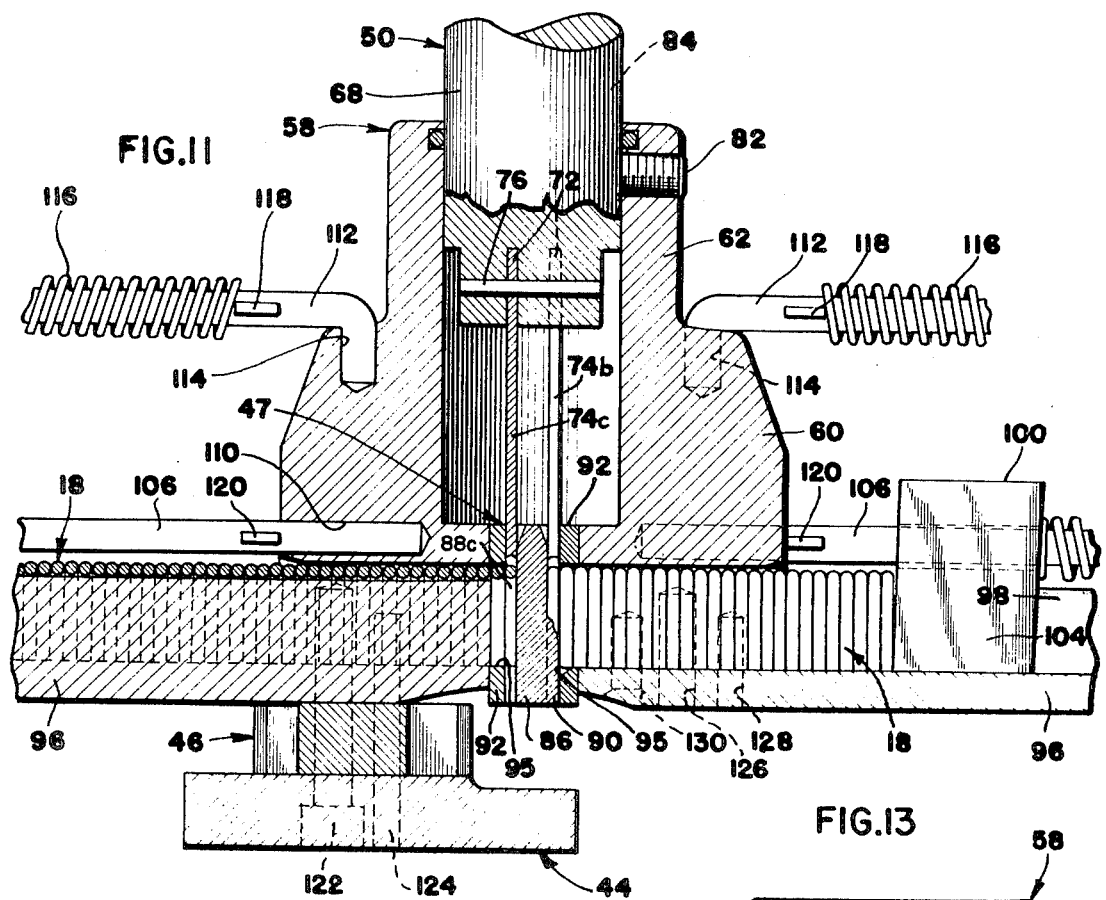
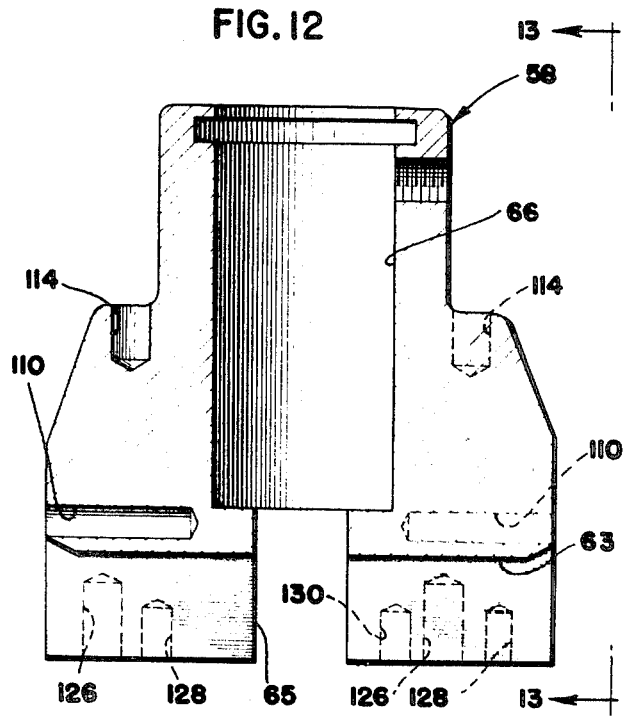
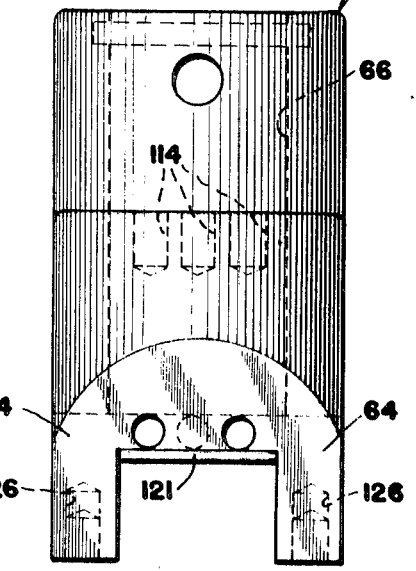
INVENTOR
FRANK E. McCOMB
Anderson, Luedeka, Fitch, Even, Tabin
ATTYS.

United States Patent Office 3,581,350
Patented June 1, 1971

3,581,350
BELT SPLICE AND SPLICER
Frank E. McComb, River Forest, Ill., assignor to Flexible Steel Lacing Company, Chicago, Ill.
Filed Jan. 21, 1969, Ser. No. 792,330
Int. Cl. F16g *3/02;* B25c *5/16*
U.S. Cl. 24—33                                14 Claims

ABSTRACT OF THE DISCLOSURE

A splice is provided for interconnecting adjacent belt end edges and includes fasteners secured to the belt by staples and adapted to intermesh to define a knuckle for receiving a hinge pin. A device is provided which is particularly adapted to drive the staples which secure the fasteners in place.

---

The present invention relates to endless belts of the type, for example, employed in load bearing conveyors or employed in self-propelled snow vehicles to provide traction. More particularly, the invention relates to the splicing of the opposite ends of an elongated belt section to form the section into a closed loop.

It has long been conventional to employ conveyors in the form of endless belts to transport bulk material such as coal, ore, and earth at mining and construction sites, and to transport packages and other articles in manufacturing, sales and service facilities. More recently, cleated endless belts have been used to provide traction or the means of locomotion to self-propelled snow vehicles and the like. In either case, the endless belts normally include an elongated flexible belt section interconnected or spliced at opposite ends to form a closed loop.

In use, the belt loop is supported by a drum or pulley at each end and, when the occasion demands, intermediate the ends by rollers or other forms of support. Since the belt must flex as it passes around the pulley as it travels, the means used to interconnect or splice the belt ends must also be capable of flexing. In addition, when the belt is used as a conveyor to transport bulk or particulate material, it is frequently desirable that the belt trough, i.e., that it assume a concave configuration in transverse cross section. This again creates a need for flexibility of the belt at the splice.

It has been found that belt ends can be spliced through the use of fasteners which are secured to opposite end edge portions of the belt and which define loops for receiving a hinge pin. Such a splice is shown, for example, in United States Letters Patent No. 2,477,855, assigned to the assignee of the present invention. In such patent, spaced individual fasteners are secured to the belt by means of bolts which are generally of a uniform length greater than the thickness of the belt. The excess portion of the bolt is trimmed off after the fastener is tightly secured in place. While this form of fastener is highly effective and has enjoyed a considerable degree of commercial success and acceptance, a less expensive and more quickly and easily applied splice is sometimes desirable.

Accordingly, it is the principal object of the present invention to provide an improved belt splice.

Another object of the invention is to provide an improved fastener for a belt splice.

A further object of the invention is to provide an improved method and device for securing belt-connecting splice fasteners to a belt.

Other objects and advantages of the invention will become apparent with reference to the following description and the accompanying drawings.

In the drawings:

FIG. 1 is a fragmentary perspective view of an end portion of a belt showing a portion of an improved belt splice and a device for attaching same to the belt;

FIGS. 2 and 3 are enlarged fragmentary top and bottom views respectively of a fastener forming a portion of the belt splice illustrated in FIG. 1;

FIGS. 4 and 5 are enlarged fragmentary perspective views illustrating modified forms of the fasteners of FIGS. 2 and 3;

FIG. 6 is a sectional view taken along line 6—6 of FIG. 4;

FIG. 7 is a fragmentary plan view of a portion of a complete belt splice embodying various features of the invention;

FIG. 8 is an elevational view of the device of FIG. 1 for securing fasteners of the type shown in FIGS. 2–7 to a belt section;

FIG. 9 is a fragmentary sectional view taken along line 9—9 of FIG. 8;

FIG. 10 is a sectional plan view taken along line 10—10 of FIG. 9;

FIG. 11 is an enlarged fragmentary sectional elevational view of the device as viewed in a central vertical plane parallel to the plane in which the device is viewed in FIG. 8;

FIG. 12 is an isolated sectional view of a portion of the device seen in FIG. 11; and FIG. 13 is an end view of the portion of the device shown in FIG. 12, as viewed in the direction of the arrows 13—13 of FIG. 12.

Very generally, there is illustrated in the drawings a belt conveyor splice in which end portions 10 of an elongated belt (not shown in its entirety) have attached thereto fasteners which may be in the form of individual independent clips 14 (FIGS. 2 and 4–6) or a lacing strip 16 (FIGS. 1 and 3) formed of a series of such clips 14 interconnected to one another in a row. The fasteners are secured to the belt end portions by means of staples 18 applied by means of a stapling device 20. The invention is believed to be equally applicable regardless of whether unconnected clips 14 or lacing strips 16 are utilized although, for reasons which will hereinafter become apparent, the use of lacing strips 16 is believed to be most efficient in most instances. Throughout the remainder of the description, and in the claims, the term "fastener" will be deemed to include both separate clips and lacing strips embodying the inventive features of those illustrated.

More particularly, the present invention can be utilized in the splicing of belts formed of various materials but, for purposes of this description, it may be assumed that the belt is nylon reinforced molded rubber. The belt may be a single elongated strip which it is desired to form into a loop, or may be formed of a series of interconnected strips, as is the case in certain mining operations where the belt forms part of a conveyor which is repeatedly lengthened, as the mining progresses, by adding additional sections to the conveyor. In any event, the present invention is concerned with the splicing together of two belt end portions, such as the end portion 10 illustrated in FIG. 1.

Referring to the drawing, it will be noted that the end portion 10 includes an end edge 22 adjacent to which the clips 14 (or a lacing strip 16) are attached. As previously mentioned, the fasteners can take the form of either the clips or strip. However, since the lacing strip is comprised essentially of a series of interconnected clips, only one clip will be described in detail.

Accordingly, clips 14 are illustrated in their entirety in FIGS. 2–7 of the drawing, while FIG. 3, in addition, shows a portion of an attached adjacent clip, as in the case of a lacing strip. Each clip comprises generally a pair of plates adapted to be disposed on opposite sides of the belt end portion 10 adjacent the end edge 22. As illustrated, there is provided an upper plate 24 adapted to overlie the upper surface of the belt, and a lower plate 26 adapted to underlie the lower surface of the belt. When the clips 14 are united to form a lacing strip 16, the lower plates 26 are interconnected by a relatively narrow web 28 (FIG. 3) which may be provided with a transverse line of weakness (not shown) to facilitate separation or parting of the clips at the web, for reasons which will hereinafter become apparent.

It is generally more convenient to attach the clips when in lacing strip form since all clips can then be positioned relative to the belt edge simultaneously. To facilitate accurate positioning, each clip is provided with a finger 29 which projects upwardly from the forward edge of the lower plate 26 so that its inner surface may be placed in abutting relation to the end edge 22 of the belt, thereby accurately positioning the lacing strip or clips relative to the belt.

In the attachment of the clips to the belt end portion 10 where the clips are interconnected to form a lacing strip, a lacing strip is selected which is of somewhat lesser length than the width of the belt. If necessary, a lacing strip of greater length is fractured at one of the webs 28 to reduce it to the desired length. When the belt is put to use with the lacing strip attached and forming part of a splice, particularly where troughing of the belt is desired or likely to occur, repeated flexing of the belt soon fractures the lacing strip at each of the webs to thereby separate the lacing strip into individual clips. By this time, however, the clips have been secured to the belt and the interconnection of the clips one to another to facilitate attachment is no longer advantageous or necessary.

It will be noted from FIG. 1 that the upper plates 24 of the lacing strip 16 are not interconnected. Rather, even when the clips are in lacing strip form, the lateral edges of the upper plates 24 are spaced from each other so that they will not interfere with one another when the belt troughs.

The plates 24 and 26 of each clip 14 are interconnected by one or more loops 30 which are in the form of flat strips bent into a curved configuration as viewed in transverse cross section (FIG. 6) and which extend outwardly from the end edge 22 of the belt. As illustrated, the plates 24 and 26 and the loops are integral and formed from a single metallic strip. In the illustrated embodiment, each clip is provided with two loops which are of predetermined width and which are spaced from each other a distance somewhat in excess of the width of one loop so that a loop of a similar clip secured to an opposite belt edge may be accommodated therebetween (FIG. 7). In addition, the loops are located non-symmetrically relative to the plates 24 and 26 so that one loop is adjacent one side edge of the plates and the remaining loop is located slightly to one side of the center of the plates. This arrangement provides a spacing between the remaining loop and the second side edge of the plates slightly in excess of the width of one of the loops.

The mating relationship between the clips secured to adjacent belt end edges is shown in FIG. 7. There it will be noted that one of the loops 30 of a clip (shown in full line) secured adjacent the end edge 22 of one belt section 10a occupies the space between the two loops of a second clip secured adjacent the end edge of a second belt section 10b, the second clip and belt section 10b being shown in phantom. The remaining loop of the first clip occupies the space intermediate the inwardly spaced loop of the second clip and the edge of the clip. The loops cooperate to define a knuckle for receiving a hinge pin 32 which, in a preferred embodiment, is flexible to permit troughing of the belt but which, in other applications, may be rigid.

The clips 14 are secured to the belt section 10 by the staples 18, one of which is shown in FIG. 2 and portions of which are shown in FIGS. 6 and 7. The staples are of conventional design and include a pair of prongs 34 interconnected by a bight portion 36. In order to accommodate the staples, the upper and lower plates 24 and 26 respectively of each clip are provided with a pair of holes 38, with the holes of each pair being spaced a distance equal to the distance between the prongs of the staples 18. In the embodiment of FIGS. 2, 3 and 7, two side-by-side pairs of holes 38 are provided in each plate and lie generally on a common line parallel to the end edges of the belt when the clip is operatively positioned relative thereto. In the embodiment shown in FIGS. 4, 5 and 6, an additional pair of holes 38 is provided, with the additional pair lying on a line generally parallel to the line of the aforementioned two pair but spaced closer to the edge of the belt.

It will be noted that each staple securing the clips 14 in place is positioned so that the holes 38 and, hence, the bight 36 and prongs of the staples lie in a plane generally parallel to the edge. During the use of a belt conveyor, there is, of course, considerable tension on the belt and, consequently, on the splice. It has been found that when the staple lies mainly in a plane perpendicular to the end edge of the belt, there is a much greater tendency for the prongs of the staple to be straightened and released, possibly because of the direction in which the forces are applied to the prongs relative to the offset end portions thereof which provides their holding ability.

It is desirable in most instances that the surfaces of a belt conveyor be relatively smooth and free of protrusions on which material conveyed can become snagged or accumulate, or which will scratch and gouge the drums and pulleys upon which the belt is supported. Accordingly, the top plate 24 of each clip is offset downwardly intermediate the holes 38 of each pair to provide a straight or linear depression 40 which receives the bight 36 of a staple. In like manner, the lower plate 26 is offset upwardly intermediate the holes 38 of each pair to provide a depression 42 which receives the bent outer end portions of the prongs 34 of the staple. The belts are, of course, of various thicknesses, depending upon their particular application and, with a relatively thin belt, the staple prongs might conceivably be sufficiently long to overlap each other adjacent the outer surface of the lower plate 26. Accordingly, the staple driving device 20, hereinafter described, is adapted to deflect the offset outer end portion of one of the prongs 34 at an acute angle to the plane of the bight 36 and the remaining prong so that overlapping of the end portions of the prongs is less likely. To accommodate this angularly deflected prong portion, the depression 42 of the lower plate 26 is of a generally triangular configuration, as can be seen best in FIGS. 3, 5 and 7.

It is desirable that the unsupported section of the prong, i.e., that portion which extends between the lower edge of the upper plate 24 and the upper edge of the lower plate 26, be as short as possible since the shorter this section is the more tensile force it will be capable of withstanding without failure. The possibility of this failure occurring is greatest in the three staple clips which are normally used with thicker belts. Accordingly, the edge of each of the holes 38 in the lower plate 26 adjacent the edge thereof furthest from the belt edge 22 is offset inwardly to provide a shoulder 43 against which the prong bears when the belt is in tensoin. The effect of this shoulder is to shorten the unsupported span of the prong by the extent to which the shoulder projects inwardly. Of course, additional shortening of the span could be accomplished by offsetting the edges of the holes 38 of the upper plate 24 as well.

The staple driving device 20 is shown most clearly in FIGS. 8–13; one method of using the device 20 is illustrated in FIG. 1. Very generally, the device of the illustrated embodiment comprises an anvil 44, means 46 for properly positioning the device relative to the clips 14, a staple guide 47, magazines 48 for feeding staples 18 to the staple guide and locating them relative thereto, and a staple punch 50. The device as illustrated is capable of driving three staples simultaneously for attaching one of the clips shown in FIGS. 4 and 5, and will be described as such. However, the device can be modified if desired to drive two staples simultaneously for clips of the type shown in FIGS. 2, 3 and 7, or for driving a single staple, as hereinafter explained.

More particularly, the anvil 44 comprises a flat generally rectangular plate having an upper surface which is intended to be placed beneath the lower plate 26 of a clip 14 and to be engaged by the lower end portions of staple prongs 34 passing through the belt and clip and to deflect these end portions to the positions shown in FIG. 7. In this regard, it will be noted (FIG. 10) that the upper surface of the plate of the anvil is provided with three sets of depressions adjacent one of its edges (hereinafter referred to as the near edge consistent with the orientation of the anvil in FIG. 10) and with two sets of depressions adjacent the other or far edge. As will become apparent shortly, the portion of the anvil provided with three sets of depressions is utilized when three staples are driven simultaneously, while the portion of the anvil having two sets of depressions is utilized when two staples are driven simultaneously.

Each set of depressions includes a pair of shallow cavities 52 of generally concave cross sectional configuration. The cavities of each set are located on a line which extends at an acute angle to the edges of the anvil adjacent to which they are located. Each cavity is adapted to receive the end of one prong 34 of a staple 18. The two prongs of a single staple lie generally in a plane parallel to the end edge of the belt as they pass through the belt and through the holes 38 of the clip. However, when they reach the cavities 52 of the anvil, the end portion of one of the prongs (the prong which engages the cavity furthest removed from the adjacent edge of the anvil) is deflected at an angle relative to the other prong to the position shown in FIG. 7. Basically, this is due to the fact that, insofar as each cavity is concerned, the point of the prong engages the side wall of the cavity near the upper edge thereof and moves toward the lowest point of the cavity which is at its center. In the case of the cavity nearest the edge of the anvil, the prong moves essentially parallel to this edge since it engages the outer periphery of the cavity at a point which lies on a plane passing parallel to the edge of the anvil and through the center of the cavity. The remaining prong, however, engages the edge of the cavity at a point displaced from a plane passing parallel to the edge of the anvil and through the center of that cavity and thus, in moving toward the center of the cavity, moves away from the edge of the anvil. In this manner, the deflection of that one prong of the staple is effected.

The prongs 34 of the staples 18 are, of course, maintained in vertical disposition and alignment with the cavities 52 of the anvil by the staple guide 47, hereinafter described.

In order that the prongs 34 of the staple will be certain to pass through the holes 38 of the clips, the guide 46 is provided and insures that the staple guide 47 and a clip 14 are in proper alignment with each other. Basically, the means 46 for positioning the staple driving device 20 relative to the clips 14 comprises a block secured to the upper surface of the anvil 44 and provided with a plurality of indentations 54 separated by protrusions 56. The indentations and protrusions are so sized and spaced that, when a clip 14 (or a portion of a lacing strip formed from a series of interconnected clips) is properly positioned relative to the anvil, loops 30 of the clips will fit into the spaces between or adjacent the loops 30. The block is so designed, however, that the loops of the clips or lacing strips will only be received into the indentations if the clip is properly positioned relative to the anvil. More specifically, every other protrusion 56 is slightly too large to fit between the adjacent loops 30 of a single clip, thereby providing only one possible location of any one clip relative to the anvil cavities 52.

It will be noted from FIGS. 9 and 10 that the guide block 46 of the anvil is sufficiently wide and includes a sufficient number of indentations and protrusions to simultaneously accommodate three of the clips 14. Thus, the block not only is effective to locate each clip relative to the anvil, but it is also effective to locate the anvil and, thus, a clip properly positioned thereon, relative to an adjacent clip. Accordingly, if the clips are not secured together to form a lacing strip but, rather, each is secured individually to the belt, then after the first clip is attached, the guide block 46 will serve to locate the second cilp relative to it. On the other hand, the additional width of the guide block is also useful even when the clips are interconnected to form a lacing strip since it provides a greater area over which proper alignment can be achieved.

Supported on the guide block 46 of the anvil is a casting 58 which supports at least one of the magazines 48 as well as the punch 50 employed to drive the staples 18. As can be seen best in FIG. 11, the casting 58 has a generally trapezoidal base 60 when viewed in elevation and has an integral collar 62 which projects upwardly from the upper surface of the base. As seen best in FIGS. 12 and 13, the casting is generally hollow. The lower portion of the base 60 is cut away to provide a channel 63 which extends from left to right as viewed in FIG. 12 and provides an entryway defined by side walls 64 (FIG. 13) for the staples. In addition, each side wall 64 is cut away centrally, as at 65, to receive the staple guide 47, referred to in detail shortly. Finally, a central bore 66 extends vertically through the collar and base into communication with the staple-receiving channel and accommodates a punch holder 68 forming part of the punch 50 by means of which the staples are driven.

The punch holder 68 (FIG. 11) comprises generally a solid metal rod of significant diameter and strength provided at its upper end with a cap 70 formed of a durable material such as nylon which is capable of receiving repeated blows of a hammer or mallet without becoming deformed or slivered. The lower end of the punch holder 68 is provided with a pair of parallel cross cuts 72. One of these cross cuts receives the upper ends of each of two spaced but side-by-side staple driving punches 74a and 74b which lie generally in a single plane within the cross cut. The other cross cut receives the upper end of a single staple driving punch 74c located in general alignment with the space intermediate the punches 74a and 74b of the other cross cut. Each punch is in the form of a flat strip and is secured within its respective cross cut by a single fastener 76 which passes through the punch on the vertical center line thereof and permits some lateral movement of the punches to facilitate assembly of the device.

The cross cuts 72 of the punch holder 68 are located adjacent the vertical centerline thereof, leaving an outer margin on each side of the cross cuts 72. The clearance between the side walls of the central vertical bore of the casting and the outer surface of the punch holder 68 is relatively close to permit a sliding movement with little play. Rotation of the punch holder within the bore is prevented by the cooperating relationship between a set screw 82 which is threaded through the collar 62 of the casting and a longitudinally oriented groove 84 provided in the side wall of punch holder (FIG. 11). Interengagement between the set screw 82 and the upper edge of the groove 84 limits the extent of downward movement of the punch holder and thereby prevents the lower ends of the punches from engaging the anvil 44 and becoming damaged.

The punches 74 more in grooves defined by the staple guide 47 which comprises generally a central block 86, one vertical face of which is provided with a pair of vertically disposed grooves 88a and 88b separated by an outwardly projecting rib 90 (FIG. 9). The opposite vertical face of the block is provided with a single horizontally centered groove 88c. Secured adjacent each face of the block 86 is a guide plate 92 having a central window 94 providing access to the grooves 88 and through which the staples 18 can be inserted into the grooves one by one when fed in a row. The portion of each guide plate 92 defining the lower edge of the window 94 is chamfered on its inner surface so that the inner surface slopes downwardly and inwardly, as at 95 (FIG. 11), thereby guiding the staples inwardly and preventing them from abutting the lower edge of the window if slightly misplaced or misformed. The staple guide 47, comprising the block 86 and guide plates 92, spans the channel 63 with its opposite ends positioned in the notches 65 in the casting 58. In such position, the portions of the plates 92 located adjacent the upper and lower edges of the window cooperate with the grooves of the block 86 to define slots which serve to receive and guide the punches 74 for vertical movement.

Secured to the lower face of the casting 58 are the magazines 48, one of which extends outwardly in one direction and the other of which extends outwardly in the opposite direction, both, however, being parallel and having portions of their adjacent ends extending inwardly into the channel 63 provided in the base of the casting. Each magazine includes a flat plates 96 (FIGS. 8 and 11). The magazine which extends toward that surface of the staple guide 47 which includes the grooves 88a and 88b is provided with a pair of upstanding flanges 98 which serve as saddles for rows of interconnected staples 18 (FIG. 1). The magazine which extends toward the opposite surface of the staple guide 47, having only a single groove 88c, also includes a plate 96 and a single centrally located flange or saddle 98.

The staples 18 carried in a row on each of the saddles 98 are urged toward the staple guide 47 by a pusher 100 (FIG. 8) in the form of a block adapted to ride on the upper surface of the saddle and having a pair of depending skirts 104 which are adapted to be disposed on opposite sides of the saddle. The block 102 is provided with a hole (FIG. 11) which slidably receives the lower arm 106 of a U-shaped pusher rod 108. The end of the arm 106 projects into a hole 110 which extends horizontally into the casting 58 a short distance in parallel relation to the saddle 98 (FIGS. 11–13). An upper arm 112 of the U-shaped rod 108 is offset downwardly adjacent its outer end and this offset portion is received into a generally vertically disposed hole 114. The resilience of the rod 108 tends to urge the arms together and therefore maintain the outer end of the upper arm in the hole 114, and, consequently, the outer end of the lower arm in the hole 110.

The pusher 100 is biased for movement along the saddle toward the casting by a coil spring 116 which encircles the rod and extends generally from the outer side of the pusher (i.e., the side furthest from the casting) to a pinched portion 118 of the upper rod adjacent the end thereof. This pinched portion defines a shoulder against which one end of the spring abuts. A similar pinched area 120 is provided in the lower arm 106 of the rod 108 spaced inwardly from its end and serves to retain the pusher on the rod in the event the rod is removed from the device.

From FIGS. 8 and 11, will be observed that the pusher blocks 100 are biased for movement along the saddles 98 of the magainzes and urge a row of staples carried on the saddle toward the staples guide 47 through the windows 94 of the plates 92 thereof. In this regard, the upper edge of each end of the channel 73 is chamfered, as at 121, to guide the staples into the channel. When the punches are in a raised position, the leading staple 18 of the row will enter a groove 88 of the guide and, as the punch 74 of that groove descends, as when the cap 70 of the punch holder 68 is struck a downwardly blow with a hammer, that lead staples is driven downwardly to drive the prongs of the staple through a pair of holes 38 of a clip 14 and through the belt so as to bring the lower ends of the prongs into engagement with cavities 52 of anvil. Of course, if the groove 88 of the guide is occupied by a punch 74, the other staples of the magazine will not enter the groove until the punch has again been raised.

It will be noted that as the device has been thus far described, two staples are fed from one side of the guide 47 and one from the other, simultaneously, and that they all are driven simultaneously into the belt by a single blow or series of blows on the cap 70. It is desirable to drive three staples simultaneously when clips of the type shown in FIGS. 4 and 5 are used. In such instances, the anvil is secured to the casting with the side containing three sets of cavities 52 directly underlying the staple guide 47 and with each guide groove 88 in vertical alignment with one of the three sets.

While it would be possible, of course, to employ the same set of cavities 52 and, thus, the same portion of the anvil, for the two as well as for the three staple clips, the plates 24 and 26 of the two staple clip, as contemplated, need not be as deep (as measured inwardly from the loops) as the plates of the three staple clips since the plates of the two staple clips need not accommodate a third staple spaced from the other two staples. It is therefore most efficient to utilize smaller clips when the use of only two staples is contemplated with a consequent change in the location of the holes 38 relative to the loops 30. This difference in dimension can be appreciated from a comparison of FIGS. 2 and 4 and from a study of the location of the cavities 52 of the anvil relative to the inner ends of the indentations 54 on each side of the block 46, as shown in FIG. 10.

Accordingly, when a two staple clip is used, the side-by-side staple receiving grooves 88 of the guide 47 are positioned directly above and in vertical alignment with the two sets of cavities 52 located on the far side of the anvil as viewed in FIG. 10. The third groove 88 is, of course, not utilized in such an instance and actually does not overhang the anvil at all but rather projects beyond the outer edge thereof. This position of the anvil relative to the staple guide 47 and the remainder of the device 20 is not shown in the drawings.

Reversal of the position of the anvil relative to the staple guide 47 is accomplished by rendering the anvil attachable to the casting 58 in either of two positions. More specifically, the anvil 44 is provided with a pair of horizontally spaced holes countersunk at their lower surface to receive a pair of socket head cap screws 122. In addition, a pin 124 projects upwardly from the guide block 46 of the anvil in alignment with but spaced from each of the holes of the cap screws. Each side wall 64 flanking the magazine receiving channel 63 of the casting is provided with a pair of spaced holes adjacent each of its ends (FIG. 11). One of the holes 126 of each pair is tapped and receives one of the cap screws 122 while the adjacent hole 128 of the pair is adapted to slidably receive the pin 124. The holes 126 of adjacent side walls are in transverse alignment with each other while the holes 128 are similarly aligned. The holes 126 are at the same side of the holes 128 on each side of the staple guide 47, i.e., the left side as the device is viewed in FIG. 11. Thus, the pins and cap screws of the anvil can be accommodated on either side of the staple guide and can thus be fixed to the casting in either of two positions without rotating the anvil and casting relative to each other but merely by moving it longitudinally of the magazines.

When the device is utilized to apply only two staples, the magazine 48 which carries the single row of staples is, of course, not utilized and is unnecessary. Accordingly, provision is made for removing that magazine while leaving the remaining magazine intact, thereby lightening the device for such applications and preventing the possibility of the third staple being inadvertently fed and driven when not intended. In this regard, the magazine 48 which carries the double saddles 98 (the magazine to the right as viewed in FIG. 8) is secured to the casting 58 by means of a separate set of fasteners such as machine screws 130 and has, in addition, the holes 126 and 128 previously referred to. The magazine 48 which carries the single saddle is held in place by means of the cap screw 122 which holds the anvil in place. Thus, when the anvil is removed to shift its position for securing a two-staple clip, the single saddle magazine is automatically detached.

In providing the aforementioned splice, a belt end portion is provided with a suitable end edge 22, as by trimming it with a knife or the like. Then, a lacing strip 16 of the proper length is selected or, in the alternative, a predetermined number of clips 14. If the use of a lacing strip is contemplated, it is positioned adjacent the belt edge with the belt edge and the fingers 29 of the lacing strip in engagement.

When the lacing strip is so positioned, the device 20 is properly placed relative to the end clip of the lacing strip, utilizing the guide 46, and the cap 70 of the punch holder 68 is struck repeatedly with a hammer or mallet to drive the punch holder downwardly until the prongs of the staples have been driven through the lacing strip and the belt, and until the ends of the prongs are properly offset. The device is then moved along the lacing strip to the next location and the driving of the staples is repeated.

If separate clips are utilized in place of the lacing strip, a clip is first placed at the center or end of the belt edge and stapled in place. Other clips are then located on the device 20 and the device is properly positioned relative to the previously attached clip or clips, again using the guide 46. The other clips are secured in place by means of the device 20 in the aforementioned manner.

An improved belt splice, splice fastener, and staple driving device have thus been disclosed. While certain specific structural embodiments of the invention have been shown and described, it should be apparent that various modifications may be made therein without departing from the scope of the invention. For example, the device 20 could be constructed so that two staples could be fed and driven simultaneously from each side with a corresponding change in the clips 14, or could be constructed so that many more staples, such as eight or ten, could be fed and driven simultaneously from one or both sides.

Various of the features of the invention are set forth in the following claims.

What is claimed is:

1. For use in the fabrication of a belt splice in which opposite end edges of the belt are hinged together by means of fasteners secured thereto and interconnected by a hinge pin, each of the fasteners including a pair of spaced, generally parallel plates adapted to overlie and underlie, respectively, opposite surfaces of the belt adjacent an edge thereof when in operative position relative to the belt edge, the fastener plates adjacent each belt edge being interconnected by a plurality of loops projecting outwardly from the plates away from the belt edge, the loops of the fasteners secured to opposite belt edges being adapted to intermesh to define a knuckle for receiving the hinge pin, each of the plates of each of the fasteners including at least two pair of holes in alignment with the respective holes of the opposite plate and spaced from each other so as to enable them to receive the prongs of a staple, said pairs being laterally spaced with respect to each other in a direction generally parallel to the belt edge, a device for securing a fastener to one of the belt edges by means of staples, said device comprising an anvil adapted to be placed beneath the edge portion of the belt and that plate of the fastener underlying said belt, said anvil being provided with a depression for each of said pairs of holes, said depressions being spaced relative to each other so as to be simultaneously alignable with the pairs of holes of said fastener and being configured so as to offset the prongs of a staple driven through the holes of the fastener plates and the belt and forced downwardly into the depression, means on said device for supporting and locating a staple above each of the depressions of said anvil and a fastener supported thereon and for guiding the staple in a downward movement in which the prongs of the staple engage and enter their respective depressions, means on said device for engaging each staple and driving the prongs thereof downwardly through the belt and into its respective depression, and means on said device for engaging a predetermined portion of the fastener so as to locate the device and the fastener in predetermined relative positions such as will place each of the prongs of the staples supported by the device in vertical alignment with one of the aligned holes of the plates of the fastener.

2. A device in accordance with claim 1, wherein means are provided for simultaneously actuating the said means of each of said staples effective to engage the staple and drive the prongs thereof downwardly.

3. A device in accordance with claim 1, wherein a pair of staple-carrying magazines are provided and arranged in side-by-side relation, each magazine being adapted to feed staples successively into the staple guiding means.

4. A device in accordance with claim 3, wherein said magazines feed the staples along parallel lines from a single side of said anvil.

5. A device in accordance with claim 1 for use with a belt splice in which each of said plates of each of said fasteners includes at least three pair of spaced holes with two of the pair being laterally displaced relative to each other along the belt edge in an area extending generally parallel to the belt edge when the fastener is operatively positioned relative thereto, the lateral displacement of the two pair being such as to not significantly exceed the distance between the holes of the third pair, the third pair being displaced from the area of the other two pair in a direction normal to the belt edge when the fastener is operatively positioned relative thereto and lying on a line intersecting and generally normal to the two pair, wherein said anvil is provided with one of said depressions for each of said pair of holes, said depressions being arranged relative to each other so as to be simultaneously alignable with the pairs of holes of said fasteners, wherein means are provided on said device for simultaneously supporting and locating a staple above each of the depressions of said anvil and a fastener supported thereon and for guiding the staple in a downward movement in which the prongs of the staples engage and enter their respective depressions, and wherein means are provided for each staple for engaging the staple and driving the prongs thereof downwardly through the belt and into its respective depression.

6. A device in accordance with claim 5, wherein means are provided for simultaneously actuating the said means of each of said staples effective to engage the staple and drive the prongs thereof downwardly.

7. A device in accordance with claim 5, wherein a pair of staple-carrying magazines is provided, each of said magazines being adapted to feed staples successively into a position above one of the two of said depressions corresponding to the two pair of holes of said fastener and in vertical alignment therewith, and wherein said aforementioned means also includes a third staple-carrying magazine adapted to feed staples successively into a position above and in vertical alignment with the remaining one of said three depressions.

8. A device in accordance with claim 7, wherein said staple-carrying magazines feed staples toward said anvil in directions transverse to the end edge of the belt when operatively positioned relative thereto, and wherein said pair of staple-carrying magazines feeds staples toward said anvil from the one side thereof and said third staple-carrying magazine feeds staples toward said anvil from the opposite side thereof.

9. A device in accordance with claim 7, wherein said third staple-carrying magazine is readily detachable from said device without affecting the effectiveness of said remaining two magazines or the means for engaging and driving the staples fed by said remaining two magazines.

10. For use in the fabrication of a belt splice in which opposite end edges of the belt are hinged together, a fastener adapted to be secured to the end edge of the belt and to cooperate with a fastener secured to the edge defining the opposite end of the belt to define a knuckle for receiving a hinge pin, said fastener comprising a pair of spaced, generally parallel plates adapted to overlie and underlie, respectively, opposite surfaces of the belt adjacent an end edge thereof, there being a pair of spaced holes provided in each of said plates, each hole of the pair in one plate being in alignment with a respective hole of the pair of the opposite plate, the holes of each pair being of such a size and so spaced as to enable them to receive the prongs of a staple extending through and between the plates, the holes of each pair lying on a line generally parallel to the end edge of the belt when the fastener is operatively positioned relative thereto, one of said plates being offset in the direction of the opposite plate in an area including said holes, said offset portion being of sufficient size to accommodate the end portion of one prong lying on a line connecting said holes and extending in the direction of the other prong and to also accommodate the end portion of the other prong extending in the general direction of the first-mentioned prong but at an acute angle to the line connecting the holes, and at least one loop interconnecting said plates and projecting outwardly from the plates away from the belt edge when the fastener is in operative position relative to the belt edge.

11. A staple driving device comprising an anvil adapted to rest upon a supporting surface and having an upper surface provided with a depression configured to offset the end portions of the prongs generally in the direction of each other but with a least one of the end portions displaced so that, when both end portions are fully offset, they will not overlap each other regardless of their length, means for supporting and locating a staple above the depression with the prongs of the staple extending downwardly toward the depression and in vertical alignment therewith, and means for engaging the staple so located and driving the prongs thereof downwardly into the depression.

12. A device in accordance with claim 11, wherein said depression is configured so that the end portion of one of the prongs is offset so as to lie generally in a plane containing the remainder of the prong and the portion of the staple connecting the prongs while the end portion of the other prong is offset so as to lie in a plane disposed at an acute angle to the first-mentioned plane.

13. For use in the fabrication of a belt splice in which opposite end edges of the belt are hinged together by means of fasteners secured thereto and interconnected by a hinge pin, each of the fasteners including a pair of spaced, generally parallel plates adapted to overlie and underlie, respectively, opposite surfaces of the belt adjacent an edge thereof when in operative position relative to the belt edge, the fastener plates adjacent each belt edge being interconnected by a plurality of loops projecting outwardly from the plates away from the belt edge, the loops of the fasteners secured to opposite belt edges being adapted to intermesh to define a knuckle for receiving the hinge pin, each of the plates of each of the fasteners including a pair of holes in alignment with the respective holes of the opposite plate and spaced from each other so as to enable them to receive the prongs of a staple; a device for securing a fastener to one of the belt edges by means of a staple, said device comprising an anvil adapted to be placed beneath the edge portion of the belt and that plate of the fastener underlying said belt, said anvil being provided with a depression configured so that the prongs of a staple driven through the holes of the fastener plates and the belt and forced downwardly into the depression will be offset generally in the direction of each other but will be displaced so that when fully offset the end portions will not overlap each other regardless of the length of the prongs relative to the thickness of the belt, means on said device for supporting and locating a staple above said anvil and a fastener supported thereon and for guiding the staple in a downward movement in which the prongs of the staple engage and enter said depression, means on said device for engaging the staple and driving the prongs thereof downwardly through the belt into said depression, and means on said device for engaging a predetermined portion of the fastener so as to locate the device and the fastener in predetermined relative positions such as will place each of the prongs of the staple supported by the device in vertical alignment with one of the aligned holes of the plates of the fastener.

14. A device in accordance with claim 13 wherein said depression is configured so that the end portion of one of the prongs is offset so as to lie generally in a plane containing the remainder of the prong and the bight portion of the staple connecting the prongs while the end portion of the other prong is offset so as to lie in a vertical plane disposed at an acute angle to the first mentioned plane but so as to lie also in the horizontal plane of the offset end portion of the one prong.

References Cited

UNITED STATES PATENTS

| 637,902 | 11/1899 | Spery | 29—243.51 |
| 973,370 | 10/1910 | Michener | 227—120 |
| 2,716,749 | 9/1955 | Timmerbeil | 227—120X |
| 2,935,774 | 5/1960 | Schick | 24—33B |
| 3,176,358 | 4/1965 | Leflon | 24—33B |
| 3,261,085 | 7/1966 | Hobson | 227—147X |

FOREIGN PATENTS

| 1,003,512 | 9/1965 | Great Britain | 24—33B |

DONALD R. GRIFFIN, Primary Examiner

U.S. Cl. X.R.

29—243.51; 227—120